United States Patent [19]

Rausch

[11] Patent Number: 4,701,154
[45] Date of Patent: Oct. 20, 1987

[54] REINFORCED BELT ASSEMBLY AND METHOD OF MANUFACTURE

[75] Inventor: Doyle W. Rausch, Niles, Mich.

[73] Assignee: National Standard Company, Niles, Mich.

[21] Appl. No.: 724,610

[22] Filed: Apr. 18, 1985

[51] Int. Cl.$^4$ ............................ F16G 1/28; F16G 1/08
[52] U.S. Cl. ..................................... 474/205; 474/268
[58] Field of Search .............. 474/205, 262, 263, 268, 474/260

[56] References Cited

U.S. PATENT DOCUMENTS

| | | | |
|---|---|---|---|
| 1,223,742 | 4/1917 | Sloper | 474/271 |
| 2,631,463 | 3/1953 | Waugh | 474/263 X |
| 3,156,128 | 11/1964 | Williams | 474/205 |
| 4,026,162 | 5/1977 | Berg | 474/205 |
| 4,332,576 | 6/1982 | Stecklein et al. | 474/205 |
| 4,434,019 | 2/1984 | Hollaway, Jr. | 474/263 X |

Primary Examiner—Stephen J. Novosad
Assistant Examiner—Thuy M. Bui
Attorney, Agent, or Firm—Emrich & Dithmar

[57] ABSTRACT

A laminated reinforcing material structure provides the reinforcement for a reinforced belt assembly. A method of manufacturing laminated reinforced belt assemblies is described.

42 Claims, 15 Drawing Figures

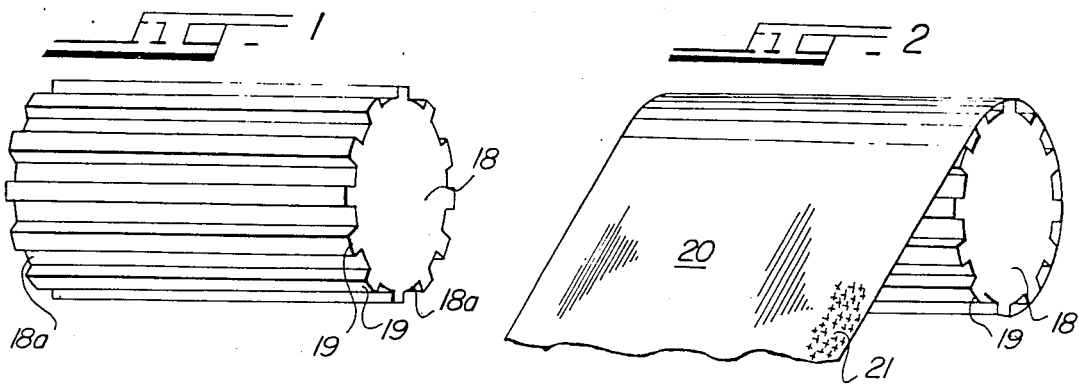
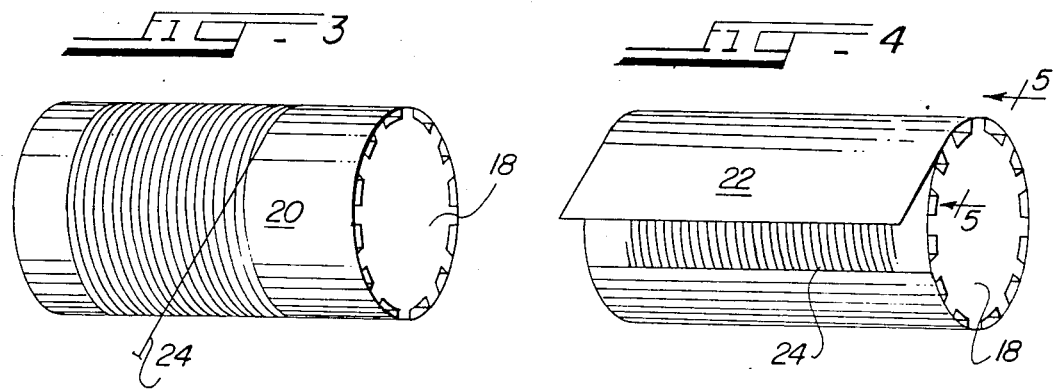
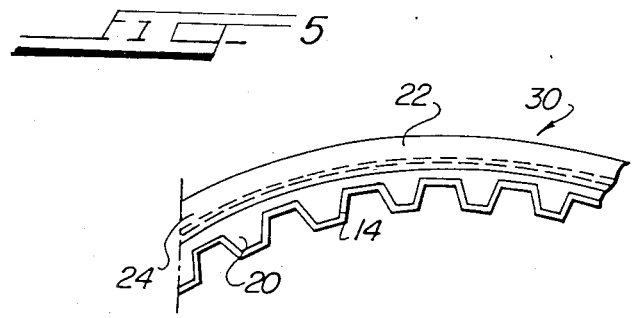

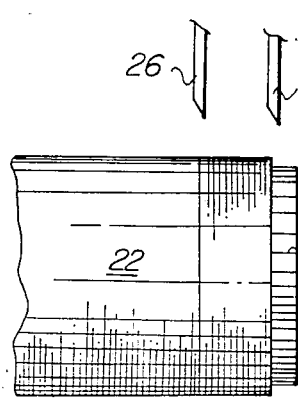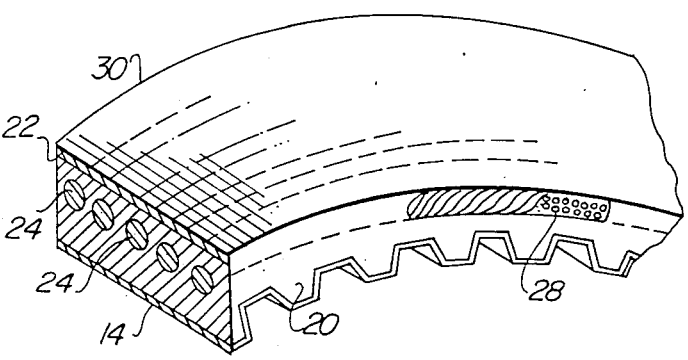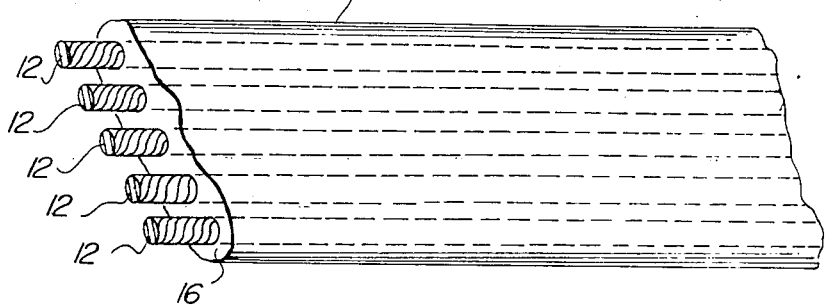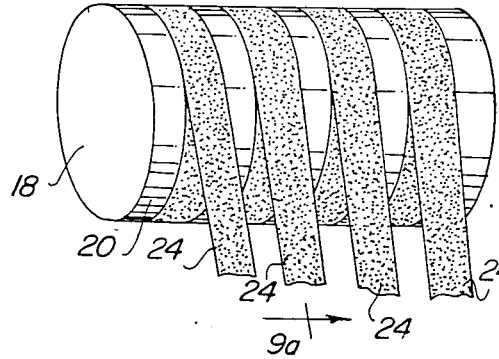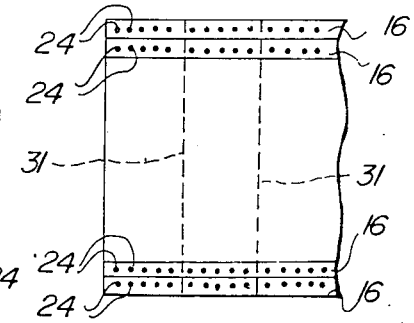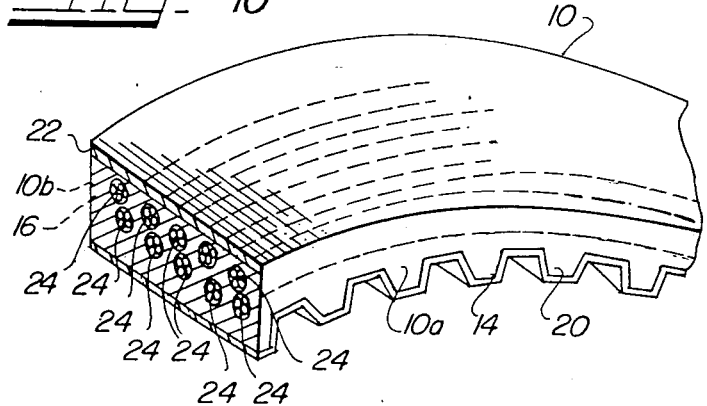

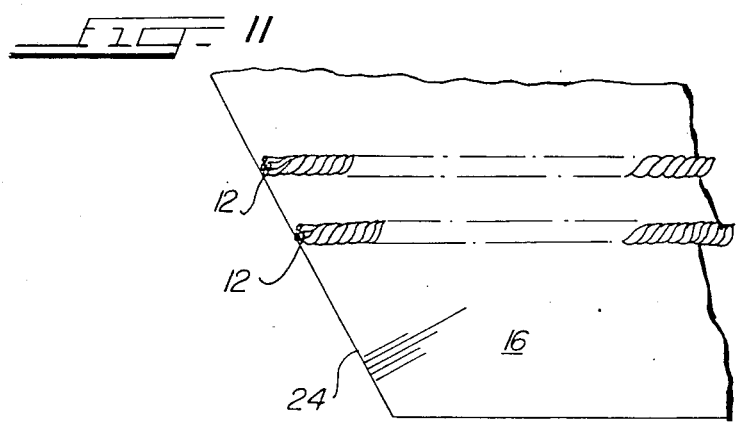
FIG. 11
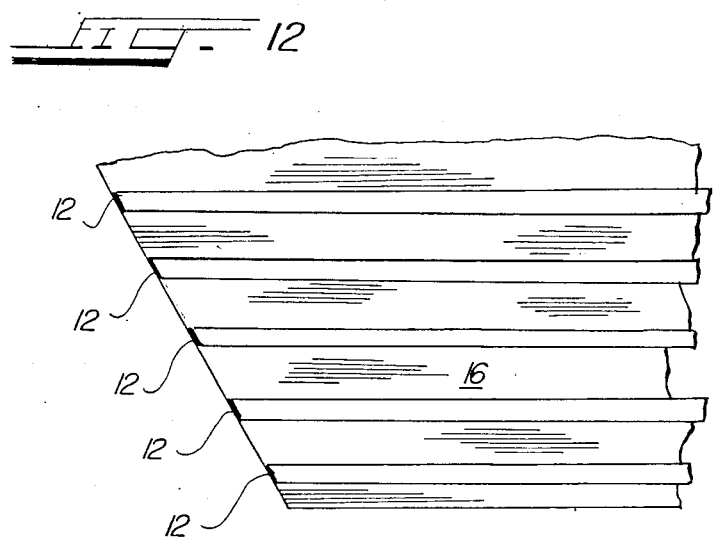
FIG. 12
FIG. 13
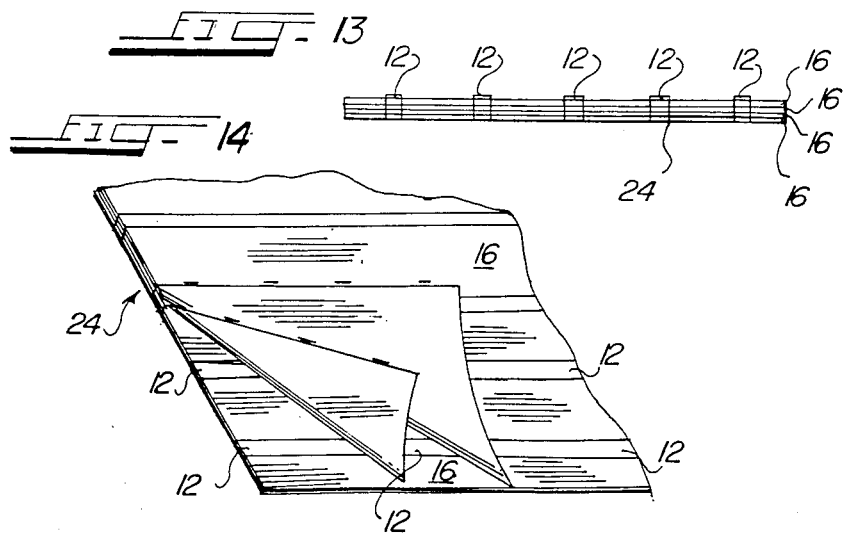
FIG. 14

REINFORCED BELT ASSEMBLY AND METHOD OF MANUFACTURE

BACKGROUND OF THE INVENTION

The present invention relates to a novel reinforcement member for flexible drive belts and, more particularly, to a novel reinforcement member and method of manufacturing timing belts. The present application is related to a co-pending application Ser. No. 724,604, filed in the name of the present inventor and assigned to the assignee of the present invention.

Timing belts are flexible drive belts, similar to pulley-type belts, which have teeth on one or more sides of the belt which permits the belt to perform much as gears perform in transmitting precise precision motion. Timing belts, also known as synchronous belts, generally do not transmit the amount of power that a gear will transmit, but offer light weight and alignment flexibility with the advantage of non-slip precision motion transmission. In such precision motion transmission, the motion is transmitted by the pulley teeth meshing with the belt teeth and during the meshing operation of the engagement and disengagement of the teeth, relative movements take place between the pulley teeth and the belt teeth. Accordingly, several prior art structures and compositions have been suggested for manufacturing belt structures which provide a high degree of flexibility while maintaining the necessary wear and life characteristics of the belt.

Belts for transmitting motion have been known for many years, as evidenced by U.S. Pat. Nos. 1,928,869, 1,611,829, 3,464,875 and 4,266,937 which describe processes in which the cogs or teeth are preformed in some manner and placed about a drum and then the remaining portion of the belt components or belt sleeve is wrapped around the teeth to form the completed uncured belt sleeve. More recently U.S. Pat. No. 4,487,814 describes a belt construction and the method of manufacture of the same.

Conventional timing belt constructions for industrial use, which include V-belts and drive belts constructions, are generally comprised of a polymeric matrix material, such as, rubber or polyurethane, and the like, reinforced with a higher strength material, primarily glass, fabric or an arumid, and with an even higher Young's modulus filament, primarily metal, so as to resist stretching and maintain precise belt-tooth spacing under operating load conditions. Moreover, such timing belts, containing glass or fabric reinforcements, generally do not possess sufficient Young's modulus coefficients to withstand stretching or elongation of the belt during operating loads. Thus, the preferred reinforcement is generally a metal, such as steel.

Although, timing belts comprised of rubber reinforced with metal filaments, such as steel cables and the like have been suggested, such belt structures present problems relating to corrosion of the metal within the belt, slipping and fatigue of the metal during operating load, adhesion problems with respect to the metal to the rubber reinforced belt construction and the difficulty of producing a belt construction possessing the necessary flexibility and stretch required in order to effectively utilize steel as a reinforcing member of the belt. The flexibility of the belt is necessary to prevent, during the operating load conditions of the belt motion transmitted from the pulley teeth meshing with the belt teeth, the engagement and disengagement of the pulley teeth and the belt teeth with respect to each other, which action results in substantial teeth wear in that portion of the belt construction.

Importantly, also, and perhaps the most important difficultly associated with the use of steel as the reinforcement tensile member within a belt construction relates to the difficulties associated with the use of steel in the method of manufacturing for timing belts. In general, timing or drive belts are manufactured by applying an inner rubber reinforced layer from a continuous sheet around a mandrel drum having an outer surface longitudinally grooved, which grooves provide the internal teeth molded structure in the timing belt construction. Thus, initially, a continuous layer of uncured rubber reinforced material is positioned and layed around the mandrel to form a tubular sleeve of material. Conventionally, a reinforcement cord or filament is then wrapped about the inner reinforced sheet of rubber continuously across down the length of the tubular sleeve. Next, an outer rubber protective layer is stitched and wrapped about the reinforcement cord or filament wrap and the resultant uncured long layered tube of rubber reinforced material is placed in a curing apparatus to cure the composite structure. Thereafter, cutting knives are positioned adjacent the sleeve to cut predetermined widths of the timing belts off of the formed and cured composite sleeve to produce the dimensioned timing belt, as desired. However, during the cutting operation of the layered and cured sleeve, the reinforcement material is cut and exposed at the sides of the cut belt. Such exposed steel ends behave poorly in use and cause difficulty during the cutting operations. Moreover, such structures permit corrosion and the tendency of the steel filament cord to move out of the side of the belt, to catch moving parts of the mechanical device. Such difficulties result in a timing belt construction which is unsatisfactory and a timing belt that possesses a short operating lifetime.

It follows that great manufacturing difficulties are introduced to overcome the above described deficiencies of having the reinforcement material emerge from the belt assembly sidewalls.

The above-described drawbacks and shortcomings of the prior art belt constructions and the conventional method of manufacturing timing belts and other types of V-belts or drive belts, and the secondary difficulties associated with the manufacture of such belt structures will be hereinafter described with reference to FIGS. 1–7.

As shown in FIG. 1, a cylindrical metal mold or mandrel 18 having longitudinally extending grooves 18a or teeth 19 on the outer surface thereof is provided as the former for the belt construction. In FIG. 2, a strip of uncured polymeric matrix material 20 is positioned about the outer surface of the metal mandrel 18 to provide the gear tooth engaging wear surface 14 portion of the prior art belt construction or assembly 30. The strip of polymeric matrix material 20 may be wrapped several times around the mandrel 18 to provide a wear and friction surface portion of a belt assembly and is comprised of a reinforcing fiber material 23 disposed substantially uniformly throughout the polymeric matrix material 20 to provide the gear-tooth wear surface portion 14 of the belt assembly 30. During manufacture, the application of the strip of polymeric matrix material 20 is sufficient to provide the desired buildup and thickness of the gear-tooth wear surface portion of the prior art belt assembly 30.

As shown in FIG. 3, the next step in the process for manufacturing a cog or tooth-type belt construction or assembly 30 is the positioning of the reinforcing cord or filament 24 about the strip of polymeric matrix material 20. Generally, as described in U.S. Pat. No. 3,188,254, the reinforcing cord 24 is spirally spun around the periphery of the strip of polymeric matrix material 20 and applied under high tension. The reinforcing cord 24 may be of such material such as nylon, rayon, polyester, glass fibers or steel and the application of the cord about the mandrel assists the polymeric matrix material 20 in flowing into the grooves 18a between the longitudinal teeth 19 of the mandrel 18.

After the reinforcing cord or filament 24 has been wound about the mandrel 18, as shown in FIG. 4, an additional sheet or cover layer 22 of a plastomeric or rubber material, of a type known to those skilled in the art, is positioned around the wound reinforcing cord and matrix material and stitched thereon to complete the raw uncured tubular sleeve of belting material. Thereafter, tubular sleeve and mandrel assembly is positioned in a conventional steam vulcanizing process, which is well known in the art, to complete the vulcanizing process of the belt assembly. During curing or vulcanization, there is additional flow of rubber or elastomeric material throughout the composite structure to provide a cured integral belt sleeve, the composite as shown in cross-section in FIG. 5. Thereafter, as shown in FIG. 6, the cured belt sleeve on the mandrel is removed from the curing mold and cut by knives 26 into individual belt constructions or assemblies 30, as shown in FIG. 7 and disclosed in U.S. Pat. No. 4,487,814. As shown in FIGS. 3 and 7, because the reinforcing cord or filament 24 is spirally wound about the mandrel, when the individual belts are cut from the cured sleeve, the cutting operation necessarily provides a plurality of areas on the cut side of the belt assembly 30 where the steel reinforcing cord or filament 24 is exposed along the side and at the ends, as shown by 28 in FIG. 7. These exposed ends permit corrosion within the belt assembly, which reduces operating lifetimes of the belt assembly 30, and permit the steel filament or other reinforcing cord to move out of the side of the belt to catch on the mechanical devices driving the drive belt.

SUMMARY OF THE INVENTION

One object of the present invention is to provide a novel reinforced belt assembly or construction which is cut from a cured belt sleeve wherein the reinforcing cord or filament material is positioned and sealed within the body of the belt construction.

A further object of the present invention is to provide a reinforcing cord or filament material comprised of a reinforcing member associated with a carrier member, with the carrier member being continuous in length in the form of a ribbon, tape or extrudate and wherein the reinforcing member possesses a Young's modulus greater than the material comprising the extrudate or tape and wherein the extrudate, tape or ribbon holds in a regulated array the reinforcment member within or on the carrier member. Such a reinforcement material permits discrete winding thereof upon a mandrel to provide a structure which permits the subsequent cutting of belt assemblies wherein the reinforcing cord or member is positioned and sealed within the body of the belt construction.

Still another object of the present invention is to provide a novel method of manufacturing belt assemblies or constructions.

A further object of the present invention is to provide a laminated reinforcing material comprised of sheet or ribbon of a carrier member having foil strips of a reinforcing member mounted thereon, possessing a Young's modulus greater than the carrier sheet, and which provides a laminated reinforcing material which may be circumferentially wound about a mandrel to permit subsequent cutting of belt assemblies wherein the reinforcing member is positioned and sealed within the body of the belt construction.

A further object of the present invention is to provide a novel reinforcing cord or filament material containing a reinforcing member maintained in a regulated array by an elastomeric or polymeric carrier member, which carrier member is compatible upon curing with the rubber or polymeric material composition which comprises the reinforced belt construction.

BRIEF DESCRIPTION OF THE DRAWINGS

FIG. 1 is a perspective view illustrating the cylindrical metal mandrel utilized in manufacturing reinforced belt assemblies or constructions;

FIG. 2 is a perspective view illustrating the application of a polymetric matrix material to the metal mandrel in accordance with the prior art;

FIG. 3 is a perspective view illustrating the winding of a reinforcing cord or filament around the mandrel during a step in the manufacture of a reinforced belt assembly in accordance with the prior art;

FIG. 4 is a perspective view illustrating the securing of an outer rubber layer material to the wrapped belt assembly shown in FIG. 3;

FIG. 5 is a cross-sectional view taken along lines 5—5 of FIG. 4;

FIG. 6 is a fragmentary isometric view illustrating the cutting of the belt sleeve after curing to produce an endless reinforced belt construction in accordance with the prior art;

FIG. 7 is a fragmentary isometric view with parts in cross section illustrating a typical belt construction in accordance with the prior art;

FIG. 8 is a fragmentary isometric view with part in cross section of one embodiment of a reinforcing cord or filament material in tape from illustrating a reinforcing member embedded within an extruded carrier member or body in accordance with the present invention;

FIG. 9 is a fragmentary perspective view illustrating the circumferentially positioning of the reinforcing cord or filament material about the mandrel during a step in the manufacture of a reinforced belt assembly in accordance with the present invention;

FIG. 9A is a cross-sectional view taken along lines 9A—9A of FIG. 9;

FIG. 10 is a fragmentary isometric view with part in cross section illustrating a reinforced belt construction or assembly in accordance with the present invention;

FIG. 11 is a fragmentary isometric view of a further embodiment of the reinforcing cord or filament material comprising a reinforcing cable element held in a regulated array on an elastomeric or polymeric carrier sheet member or tape in accordance with the present invention;

FIG. 12 is a fragmentary isometric view of a further embodiment of a reinforcing cord or filament material comprising strips of a reinforcing member deposited in a regulated array on a carrier sheet member in accordance with the present invention;

FIG. 13 is a cross-sectional view taken along lines 13—13 of FIG. 14; and

FIG. 14 is a perspective view illustrating the depositing of the embodiment of the reinforcing member of FIG. 12 one upon the other to provide a laminated reinforcing material in accordance with the present invention.

DETAILED DESCRIPTION

Referring now to the drawings of FIG. 8-14, wherein like numerals have been used throughout the several views to designate the same or similar parts, in FIG. 8 there is shown a reinforcing cord or filament material or portion 24 which is in the form of a continuous length of tape or ribbon. The reinforcing cord or filament material 24 is comprised of a plurality of reinforcing members or means 12 embedded within an extruded carrier member or body 16 in a regulated array. The carrier member or body 16 may be in the form of a tape or ribbon which is utilized in the present invention by circumferentially winding the reinforcing cord of filament material 24 about the applied strip of polymeric matrix material 20, which is first applied during the manufacturing of the reinforced belt assembly or construction 10.

The continuous length of reinforcing material 24 is circumferentially wrapped about the strip of polymeric material 20, that has been positioned on the outer surface of the mandrel 18, as shown in FIGS. 3 and 9. The resultant configuration of the wound reinforcing material 24 is schematically depicted and shown in cross section in FIG. 9A. As depicted in FIG. 9A, the reinforcing cord or filament material 24 is circumferentially wrapped around the mandrel 18 (not shown) having the strip of polymeric matrix material 20 positioned thereon. The reinforcing cord or filament material 24 is circumferentially wrapped in an overlapping relationship to provide at least more than one convolution of the reinforcing cord or filament material 24 around the mandrel and strip material 20 to provide the novel reinforced belt construction in accordance with the present invention. As schematically shown in FIG. 9A, the reinforcing cord or filament material is wrapped twice about the mandrel 18. Thus, it is preferred that more than one convolution of the reinforcing filament material is desired to reduce fretting and to increase flexibility of the cured reinforced belt assembly or construction 10.

As shown in FIG. 9A, the dotted lines 31 represent the area between the positioning of the ribbon of reinforcing cord or filament material 24 about the mandrel and represent the cutting lines or area engaged by knives 26 which cut the cured belt sleeve to provide the reinforced belt assembly or construction 10 in accordance with the present invention. Additionally, as shown in FIG. 10, the side walls 10A and 10B of the completed and cut belt assembly or construction 10 do not have any reinforcing member 12 extending outwardly therethrough and the novel reinforced belt assembly or construction 10 in accordance with the present invention provides a sealed and uniformly reinforced belt construction. Also, as schematically shown in FIG. 10, the reinforced belt assembly 10 includes a reinforcing cord or filament material 24 having 5 reinforcing cable members 12 embedded within the extruded carrier body 16 wound twice upon itself. The reinforcing members 12 may be brass coated steel cord having a plurality of filaments stranded into a cable, as is well known in the cable stranding art. The extruded carrier body 16 may be comprised of a rubber based material which will substantially cure and fuse with the remaining body portion of the belt assembly during curing or vulcanization of the belt assembly sleeve. However, for polyurethane belt assemblies, the extruded carrier body 16 may be comprised of polyurethane or a like material which is compatible with the matrix or body component of the belt assembly.

FIG. 11 illustrates a further embodiment of the present invention wherein the reinforcing cord or filament material 24 include a reinforcing member or portion 12 deposited on and held in a fixed array upon a carrier sheet or member 16. The reinforcing member 12 may be comprised of a wire, strand, braid, or woven tape deposited in a regulated and continuous array on the carrier sheet 16 and is held in fixed array thereon by an adhesive or other sealing means. As previously set forth with respect to the embodiment shown in FIGS. 8-10, the novel reinforcing cord or filament material 24 is circumferentially wound around the mandrel 18, having the polymeric matrix material 20 deposited on the outer surface of the mandrel, preferably, more than one convolution, to build up the desired reinforcing cord or filament material within the body of the reinforced belt construction. Again, the carrier sheet 16 may be comprised of a rubber based composition or other polymeric matrix material, such as polyurethane. It being sufficient that the carrier sheet or tape member 16 possesses the property and function of being compatible with the composition of the cured reinforced belt construction to provide a unitary reinforced belt assembly 10.

FIGS. 12-14 illustrate a further embodiment of the present invention wherein the reinforcing cord or filament material 24 includes thin foils or strips of steel 12 deposited in a regulated and fixed array onto a thin carrier member or sheet 16. The carrier member or sheet 16 may be comprised of any polymeric matrix material such as rubber, polyurethane or other plastic and be in the form of a tape or ribbon. The deposited thin steel foil strips are, preferably, spring steel of approximately 1/1,000 of an inch thick which are held in fixed array on the carrier sheet 16. The reinforcing cord or filament material 24 is circumferentially wrapped about mandrel 18, as previously set forth, to provide a laminated type reinforcing material, as shown in cross-section in FIG. 13, contains at least 5 wraps of the thin foil reinforcement material 24. The overlapping wraps of the reinforcing filament material 24 align the thin foil strips of steel one on top of the other and permit the buildup or lamination of the reinforcing material 24 within the reinforced belt construction to provide a laminated reinforced belt construction, which is heretofore been unattainable in the art. For example, thin foil strips of spring steel 1/1,000th of an inch in thickness, when deposited on a plastic carrier sheet and wrapped 10 times around the mandrel, produces a reinforcing cord or filament material 24 having a thickness of approximately 10/1,000th of an inch in thickness, a structure which possesses superior flexibility and resistance to fretting than a reinforcing cable member having a dimension of 10/1,000th of an inch in thickness. Such a laminated reinforced cord or filament material 24, when aligned and positioned about the mandrel, permits cutting between the wound laminated reinforced material on the reinforced belt sleeve to provide a reinforced belt assembly or construction 10 having the laminated reinforcing material 24 embedded completely within the cut side walls of the belt assembly, a result that has heretofore been unattainable in the art.

It is within the scope of the present invention that the reinforcing material 24 stock, which is in a tape or ribbon form, may be comprised of a width greater than the width of a reinforcement array necessary for a single belt assembly which stock may be circumferentially wound onto the mandrel 18 during the manufacturing of the reinforced belt assembly 10.

A further embodiment of the present invention includes a strip of reinforcing material 24 for use in reinforced belt constructions or assemblies 10 which includes a substantially flat braid of metal filaments. The braid of metal filaments may include a carrier member 12, therein and extending the length thereof, comprised of non-metallic material, such as, polymeric filaments, glass filaments, natural filaments or mixtures thereof. The strip of reinforcing material is circumferentially wound around the mandrel 18, having the polymeric matrix material 20 deposited thereon, under tension for more than one convolution to build up the desired laminated reinforcing material 24 within the body of the belt construction, as has been set forth above, to provide the belt assembly 10.

Additionally, another embodiment of the present invention includes a strip of reinforcing material 24 for use in reinforced belt constructions or assemblies 10 which includes a woven tape of metal filaments, metal cable or metal braid. The woven tape of metal filaments may include a carrier member 12, therein and extending the length thereof, comprised of non-metallic material, such as, polymeric filaments, glass filaments, natural filaments or mixtures thereof. The woven strip of reinforcing material is circumferentially wound around the mandrel 18, having the polymeric matrix material 20 deposited thereon, under tension for more than one convolution to build up the desired laminated reinforcing material 24 within the body of the belt construction, as has been set forth above, to provide the belt assembly 10.

What has been described is a novel reinforced belt assembly or construction containing a laminated reinforcing material therein and a novel method of manufacture of such reinforced belt assemblies which provides for reduced fretting, increased belt flexibility and the elimination of exposed reinforcment ends cut sidewalls of the belt assembly.

I claim:

1. A reinforced belt construction comprising:
a gear-tooth engaging portion,
a reinforcing material portion positioned circumferentially about said gear-tooth engaging portion, said reinforcing material portion being in the form of a strip and comprised of a continuous elongated reinforcing member associated and positioned with respect to a carrier member such that the lateral edges of said carrier member are free of said reinforcing member, and wherein said reinforcing material portion about said gear-tooth engaging portion includes more than one circumferential wrapping of said strip, and
a layer of covering material positioned about said reinforcing material portion.

2. The reinforced belt construction in accordance with claim 1 wherein said reinforcing member is a steel cable and said carrier member is a non-metallic extrudate and said steel cable is positioned in an aligned array within said carrier member.

3. The reinforced belt construction of claim 2 wherein said steel cable is brass coated and said non-metallic extrudate is a rubber based material.

4. The reinforced belt construction in accordance with claim 1 wherein said reinforcing member is a steel cable and said carrier member is a sheet member, with said steel cable being positioned in an aligned array on said sheet member.

5. The reinforced belt construction in accordance with claim 1 wherein said reinforcing member is an elongated foil strip of steel and said carrier member is a sheet member, with said foil strips of steel being positioned in an aligned array on said sheet member.

6. The reinforced belt construction in accordance with claim 5 wherein said elongated foil strips of steel are spring steel.

7. The reinforced belt construction in accordance with claim 2 wherein said steel cable is stainless steel.

8. The reinforced belt construction in accordance with claim 7 wherein said stainless steel is brass coated and said non-metallic extrudate is a rubber based material.

9. The reinforced belt construction in accordance with claim 1 wherein said carrier is comprised of a polymeric material.

10. The reinforced belt construction in accordance with claim 9 wherein said polymeric material is a rubber based material.

11. The reinforced belt construction in accordance with claim 9 wherein said polymeric material is polyurethane.

12. The reinforced belt construction in accordance with claim 2 wherein said steel cable is brass coated and said non-metallic extrudate is polyurethane.

13. A reinforced belt construction comprising:
a friction engaging portion,
a reinforcing material portion positioned circumferentially about said friction engaging portion, said reinforcing material portion being in the form of a strip and comprised of a continuous elongated reinforcing member associated and positioned with respect to a carrier member such that the lateral edges of said carrier member are free of said reinforcing members, and wherein said reinforcing material portion about said friction engaging portion includes more than one circumferential wrapping of said strip, and
a layer of covering material positioned about said reinforcing material portion.

14. The reinforced belt construction in accordance with claim 13 wherein said reinforcing member is a steel cable and said carrier member is a non-metallic extrudate and said steel cable is positioned in an aligned array within said carrier member.

15. The reinforced belt construction of claim 14 wherein said steel cable is brass coated an said non-metallic extrudate is a rubber based mateial.

16. The reinforced belt construction in accordance with claim 13 wherein said reinforcing member is a steel cable and said carrier member is a sheet member, with said steel cable being positioned in an aligned array on said sheet member.

17. The reinforced belt construction in accordance with claim 13 wherein said reinforcing member is an elongated foil strip of steel and said carrier member is a sheet member, with said foil strips of steel being positioned in an aligned array on said sheet member.

18. The reinforced belt construction in accordance with claim 17 wherein said elongated foil strips of steel are spring steel.

19. The reinforced belt construction in accordance with claim 14 wherein said steel cable is stainless steel.

20. The reinforced belt construction in accordance with claim 19 wherein said stainless steel is brass coated and said non-metallic extrudate is a rubber based material.

21. The reinforced belt construction in accordance with claim 13 wherein said carrier is comprised of a polymeric material.

22. The reinforced belt construction in accordance with claim 21 wherein said polymeric material is a rubber based material.

23. The reinforcned belt construction in accordance with claim 22 wherein said polymeric material is polyurethane.

24. The reinforncned belt construction in accordance with claim 14 wherein said steel cable is brass coated and said non-metallic extrudate is polyurethane.

25. A reinforncned belt construction comprising:
   a friction engaging portion, a reinforcing material portion positioned circumferentially about said friction engaging portion, said reinforcing material portion being in the form of a strip and comprised of reinforcing foil metal strps deposited on a carrier member in a fixed array such that the lateal edges of said carrier member are free of said reinforcing foil strips, and wherein said reinforcing material portion about said friction engaging portion includes more than one circumferential wrapping of said strip, and
   a layer of covering material positioned about said reinforcing material portion.

26. The reinforced belt construction in accordance with claim 25 wherein said reinforcing foil strip is comprised of steel foil strips of about 1/1000th inch thickness.

27. A reinforncned belt construction comprising:
   a friction engaging portion,
   a reinforcing material portion positioned circumferentially about said friction engaging portion, said reinforcing material portion being in the form of a strip and comprise of a braided reinforcing metal filament member deposited on a carrier member such that the lateral edges of said carrier member are free of said filament member, and wherein said reinforcing material portion about said friction engaging portion includes more than one circumferential wrapping of said braided strip, and
   a layer of covering material positioned about said reinforcing material portion.

28. The reinforced belt construction in accordance with claim 27 wherein said briaded reinforcing member is comprised of steel filaments.

29. The reinforced belt construction of claim 28 wherein said steel filaments are brass coated.

30. The reinforced belt construction in accordance with claim 27 wherein said briaded reinforcing metal strip further includes non-metallic filaments therein and extending the length of said braided metal member.

31. The reinforced belt construction in accordance with claim 30 wherein said non-metallic filaments are selected from a group comprised of polymers, glasses or mixtures thereof.

32. The reinforced belt construcction in accordance with claim 28 wherein said steel filaments are stainless steel filaments.

33. The reinforced belt construction in accordance with claim 32 wherein said stainless steel filaments are brass coated.

34. A reinforced belt construction comprising:
   a friction engaging portion,
   a reinforcing material portion positioned circumferentially about said friction engaging portion, said reinforcing material portion being in the form of a strip and comprised of a woven reinforcing metal member deposited on a carrier member such that the lateral edges of said carrier member are free of said woven metal member, and wherein said reinforcing material portion being in the form of a strip and comprised of a braided reinforcing metal filament member, and wherein said reinforcing material portion about said friction engaging portion includes more than one circumferential wrapping of said braided strip, and
   a layer of covering material positioned about said reinforcing material portion.

35. The reinforced belt construction in accordance with claim 34 wherein said woven reinforcing member is comprised of steel filaments.

36. The reinforced belt construction of claim 35 wherein and steel filaments are brass coated.

37. The reinforced belt construction in accordance with claim 34 wherein said woven reiinforcing metal strip further includes non-metallic filaments therein and extending the length of said braided metal member.

38. The reinforced belt construction in accordance with claim 37 wherein said non-metallic filaments are selected from a group comprised of polymers, glasses or mixtures thereof.

39. The reinforced belt construction in accordance with claim 35 wherein said steel filaments are stainless steel filaments.

40. The reinforced belt construction in accordance with claim 39 wherein said stainless steel filaments are brass coated.

41. The reinforced belt construction of claim 25 wherein said reinforcing foil strips are stainless steel foil strips.

42. The reinforced belt construction in according with claim 26 wherein said carrier member is in the form of a sheet and is comprised of polymeric matrix material compatible with the composition cured reinforced belt construction to provide a unitary reinforced belt construction.

* * * * *